United States Patent [19]

Taney

[11] Patent Number: 4,633,513

[45] Date of Patent: Dec. 30, 1986

[54] METHOD AND APPARATUS FOR CONVERTING TELEVISION SIGNALS

[75] Inventor: William H. Taney, Royersford, Pa.

[73] Assignee: Berko Technology Corporation, Limerick, Pa.

[21] Appl. No.: 616,016

[22] Filed: May 31, 1984

[51] Int. Cl.$^4$ .............................................. H04B 1/26
[52] U.S. Cl. .................................... 455/131; 455/190; 455/191; 455/315
[58] Field of Search ...................... 455/21, 22, 131, 20, 455/188-191, 314, 315

[56] References Cited

U.S. PATENT DOCUMENTS

| | | | |
|---|---|---|---|
| 2,570,475 | 10/1951 | Oestreicher et al. | 358/86 |
| 2,710,343 | 6/1955 | Thompson | 455/21 |
| 3,327,222 | 6/1967 | King, Jr. | 455/189 |
| 3,366,731 | 1/1968 | Wallerstein | 358/86 |
| 3,882,266 | 5/1975 | Walding | 358/86 |
| 3,931,578 | 1/1976 | Gittinger | 455/190 |
| 4,315,333 | 2/1982 | Yamashita et al. | 455/189 |
| 4,322,856 | 3/1982 | Ohta et al. | 455/189 |
| 4,352,209 | 9/1982 | Ma | 455/315 |
| 4,395,777 | 7/1983 | Oki et al. | 455/183 |
| 4,512,035 | 4/1985 | Victor et al. | 455/183 |

OTHER PUBLICATIONS

"Broadcast Engineering C 1972" by Howard W. Sams and Co., Inc., Apr. 1972 Edition, pp. 33-34.

Primary Examiner—Jin F. Ng
Attorney, Agent, or Firm—Eugene E. Renz, Jr.

[57] ABSTRACT

A method and apparatus for receiving a television signal of one frequency and for transmitting the television signal at another frequency. The apparatus includes a first variable tuner capable of selecting television signals in a first frequency range and a second variable tuner, connected to the first variable tuner, which is capable of transmitting the selected television signal at any one of a plurality of television frequencies in a second frequency range. A reference output component is also used to provide a fixed output frequency or channel, in lieu of the second variable tuner while the first variable tuner is being operated to select a television signal.

5 Claims, 3 Drawing Figures

METHOD AND APPARATUS FOR CONVERTING TELEVISION SIGNALS

BACKGROUND OF THE INVENTION

The present invention relates to frequency conversion devices, particularly those devices for converting television signals from a first frequency or channel to a second frequency or channel.

Community antenna television systems (CATV), master antenna television systems (MATV) and cable TV systems have been in existence for several years. One of the features common to each of these systems is the construction of a central signal distribution station or "head-end" site. From this location, all of the signals to be viewed by system subscribers are selected, processed to remove unwanted interferences, and distributed. The distribution of these channels usually occurs at frequencies different from the frequencies at which such signals were selected or received. For example, television signals at frequencies associated with channels 3, 6 and 10 could be distributed to subscribers at frequencies associated with channels 20, 22 and 24.

Previously, these types of systems distributed selected television programming on the channels on which they were received by the master antenna. For example, Wallerstein U.S. Pat. No. 3,366,731 discloses an MATV system wherey channels 2, 4 and 7 are received and processed by dedicated signal channel amplifiers. Thereafter, the individual channel signals, still at the same frequency, were mixed and distributed to sets of receivers. Particular channels would thereafter be selected by the tuners associated with each receiver. A similar type of system is shown in Oestreicher et al U.S. Pat. No. 2,570,475.

In present CATV, MATV and Cable TV systems, the problem of multiple dedicated components has intensified due to the distribution of programming on channels different from the channels on which respective signals were received. Accordingly, system owners were obligated to keep two components for each channel in inventory for use as a spare part, one for reception and one for transmission. To alleviate this problem, a number of devices were developed which were capable of selecting a single channel from a plurality of channel signals and additional devices which were capable of transmitting a signal on any one channel selected from a plurality of channels.

Walding, U.S. Pat. No. 3,882,266, shows such a device, which is capable of selecting a single channel from a range of channels at the input and providing a fixed channel output. This feature is accomplished in Walding by the provision of a variable tuner, including a filter-mixer-variable oscillator combination, at the input for selecting the desired channel and a fixed oscillator-mixer combination at the output. Walding also suggests reversing the combination, whereby the oscillator at the input is fixed and the oscillator at the output is made variable.

Yamashita et al, U.S. Pat. No. 4,315,333, discloses a VHF-UHF television superheterodyne receiver including first and second frequency conversion stages and an Intermediate frequency (I.F.) amplifying stage. Each of the first and second frequency conversion stages include a mixer, a local oscillator and an unbalanced/balanced conversion circuit interposed therebetween. The first local oscillator is said to be variable, i.e. variable tuner, while the second stage oscillator is fixed.

Ohta et al, U.S. Pat. No. 4,322,856, discloses yet another device for receiving television aural signals, which incorporates a two-stage device having a variable tuner, i.e. mixer-variable oscillator combination at the input for selecting either a VHF or UHF television aural signal and a mixer-fixed oscillator combination outputting the selected signal at a fixed frequency or channel.

Ma, U.S. Pat. No. 4,352,209, shows still a further frequency converter circuit including a variable tuner, a filter-mixer-variable oscillator combination, at the input which selects a desired television channel and up converts the signal to an Intermediate Frequency which is thereafter down converted by a mixer-fixed oscillator combination to a fixed output channel.

None of the references cited above include a variable tuned input for selecting a desired channel from a range of channels and a variable tuned output for transmitting the desired channel on a further selected channel.

Conventional design of frequency conversion devices for television signals is in a direction away from combining a variable tuner input with a variable tuner output because of the generation of interfering beat frequencies. To that end, Ohta, processing aural signals, discloses that the frequencies of the first and second oscillators need to be designed so as not to interfere with each other. Ohta, therefore, fixes the output oscillators so that an output frequency of 10.7 MHz is provided and the beat frequency between both oscillation frequencies is prevented from becomming 10.7 MHz. This teaching is believed to be confirmed by Ma who indicates that an overriding aspect of such system designs is to provide for isolation between first and second local oscillator signal frequencies to avoid generation of undesired interfering signals and signal products. Further, the April, 1972 Edition of Broadcast Engineering C 1972 by Howard W. Sams & Co., Inc., specifically states that certain channel combinations cannot be used because of interfering spurious signals, for example, channel 14 and 9, channel 14 and 5, channel 22 and 7 or channel 65 and 10 cannot be combined.

Accordingly, CATV, MATV or Cable TV systems still maintain an inventory of variable input dedicated devices and variable output dedicated devices.

SUMMARY OF THE INVENTION

Accordingly, it is an object of the present invention to provide in a single unit an apparatus for selecting a plurality of signals from a first range of frequencies and for transmitting the selected television signal at any one of a plurality of television signal frequencies in a second range of frequencies.

It is another object of the present invention to provide a television signal frequency conversion apparatus capable of receiving and transmitting television signals at preselected frequencies.

It is yet another object of the present invention to provide a television signal frequency conversion apparatus in which beat frequencies do not interfere with the quality of the television signal.

It is still another object of the present invention to provide a method of frequency converting television signals without beat frequencies interfering with the quality of the signal.

It is a further object of the present invention to provide a frequency conversion apparatus having a variable tuner input and a variable tuner output such that a single apparatus can replace a multiplicity of devices dedicated to converting particular television channels or frequencies.

These and other objects are accomplished by a method and apparatus for receiving a television signal of one frequency and for transmitting that television signal at another frequency.

The apparatus includes a first variable tuner capable of selecting at least one of a plurality of television signal frequencies in a first range of television signal frequencies and a second variable tuner which transmits the selected television signal at a television signal frequency in a second range of television signal frequencies. The problem of beat frequencies in one embodiment is resolved by the addition of a reference output member which, in response to a switch interposed between the reference output member and the first variable tuner, transmits the selected television frequency on a reference frequency or reference channel. While the television signal is being transmitted on such reference channel, the first variable tuner is adjusted to a desired channel or frequency.

I have also discovered that if the channel selected by the variable tuner is demodulated and therafter modulated between the first and second variable tuners, that the problem of interfering beat frequencies is avoided. Therefore, a further embodiment of the invention incorporates a modulator/demodulator circuit arrangement between the input and output variable tuners.

For an apparatus according to the instant invention having continuous tuning input and output tuners, as opposed to fixed tuning which occurs in conventional television receivers, I have further discovered that a null point exists for beat frequencies, wherein the interfering beat frequencies cancel out and do not distort the signal. The null point is achieved by slightly varying the input and/or output tuning controls above or below the frequency setting associated with the channel being received and/or transmitted. I have found that such adustments do not affect the overall quality of the television signal. Therefore, another embodiment of the invention includes continuous tuning variable tuners on the input and output ends of the device.

DETAILED DESCRIPTION OF THE DRAWINGS

These and other objects and features of the present invention will become more readily apparent from the following detailed description of the preferred embodiments taken in conjunction with the accompanying drawings in which.

DETAILED DESCRIPTION OF THE PREFERRED EMBODIMENTS

Figure 1:
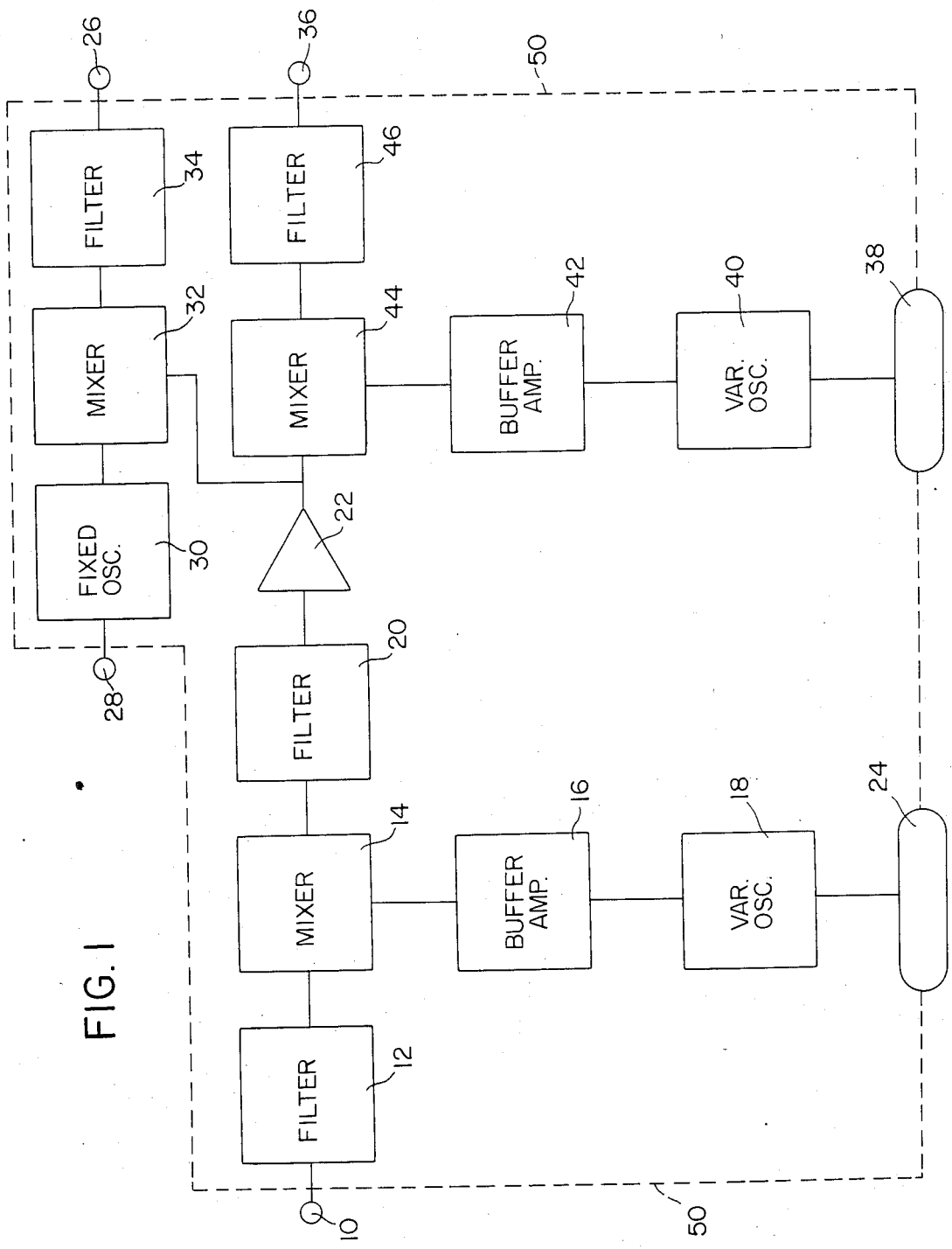
FIG. 1 is a block diagram of the circuit arrangement of an embodiment of the instant invention having a fixed reference output.

An apparatus for receiving a television signal of one frequency at its input and for transmitting the television signal at another frequency is shown in FIG. 1. A television signal, including a range of television frequencies or channels, is applied to the apparatus at input 10. In the instant embodiment, such a range of channels covers the VHF frequencies only, further embodiments to be described herein will include UHF and auxiliary channels. Such auxiliary channels will include, for example, satellite reception or studio generated television programming.

The television signal, presented to input 10 from a television antenna or other conventional source, is first passed through input filter 12, a band pass filter for the frequency range of 54-300 MHz. The filter serves to remove those signals at frequencies above and below the range of VHF channels. Thus, only VHF channels are presented to the first mixer 14. Mixer 14, buffer amplifier 16, variable oscillator 18, and filter 20 serve as the first variable tuner.

Briefly, the first variable tuner selects the particular channel which is presented to amplifier 22. The channel selection process involves the up conversion of the signal from filter 12 such that only a particular portion or band, conventionally 6 MHz, passes through filter 20. Filter 20 is also a band pass filter which in the preferred embodiment passes signals of frequencies between 373 and 379 MHz. The signal from filter 12 is up converted by beating it in mixer 14 with a signal from variable oscillator 18 passing through buffer amplifier 16. The amount of up conversion or frequency shift which occurs is determined by control 24. As control 24 increases or decreases the frequency of the variable oscillator 18, the amount of shift of the signal from filter 12 is raised or lowered. Thus, the range of frequencies is adjusted such that only individual channels are allowed to pass through filter 20 to amplifier 22.

In the preferred embodiment, the method for determining which particular television channel is being selected by control 24 is achieved by connecting a television receiver to output 26. In order to avoid potential interfering beat frequencies in the television signal, a fixed reference output member is provided. In response to a signal at input 28, fixed oscillator 30 provides a reference frequency to mixer 32 which down converts the television signal from amplifier 22 to a particular reference frequency or channel, in the preferred embodiment such frequency corresponds to channel 2. The resultant signal is passed through filter 34, which in the preferred embodiment is similar to filter 12, i.e. a band pass filter for the frequency range 54-300 MHz. The television signal thereafter passes from output 26 to a television receiver tuned to the reference channel i.e. channel 2. Thus, it can be seen by varying control 24, the selection of a particular channel at input 10 can be confirmed by viewing the television receiver tuned to the reference channel.

Once the particular television channel has been selected from the first range of television signal frequencies, the particular channel or frequency at which such signal will be transmitted can be selected. Such selection is accomplished by down converting the signal from amplifier 22 to the particular channel at which such television signal will be received. Accordingly, a television receiver is attached to output 36 and tuned to the desired channel. Thereafter, control 38 is manipulated such that the output of variable oscillator 40 is modified to such an extent that after passing through buffer/amplifier 42 to mixer 44, it beats with the output of amplifier 22, down converting or down shifting such signal. Thus, the output of oscillator 40 serves to down convert the signal from amplifier 22 to such an extent that the signal selected from the range of television signals at input 10 is now transmitted at output 36 at selected television signal frequency. Prior to transmission from output 36, such signal passes through filter 46 which in the preferred embodiment is similar to filter 12 in that it passes a band of television frequencies from 54 to 300 MHz. Thus, it can be seen that the second range of frequencies, from which selected television signals are transmitted, are also in the VHF range of signal frequencies.

Thus, any of the television signals from the VHF frequency range can be received and transmitted at any other frequency in the VHF frequency range by a single apparatus 50, avoiding the dedicated components problem of the past.

The preferred method for using the apparatus shown and described in FIG. 1, includes the steps of applying a television signal, i.e. from either a television cable or television signal antenna to input 10. A television monitor, tuned to channel 2 is connected to output 26. A switch signal is presented to input 28 which in the preferred embodiment provides a reference output as long as such switch signal is present. While the switch signal is present, the output of variable oscillator 18 is varied by control 24 until the desired channel appears on the television monitor. Thereafter, the switch signal is removed and the television monitor is connected to output 36. The television monitor is tuned to the desired channel at which the selected television signal is to be viewed. Finally, oscillator 40 is varied by control 38, until the selected television signal appears on the television monitor.

In one embodiment of the instant invention, oscillators 18 and 40 are continuous tuning oscillators, i.e. the frequency output does not occur in stages or distinct increments, but rather, can be varied over its entire frequency range. If beat frequency interference occurs once the output channel has been selected, a slight variation of the tuning controls above or below the frequency setting associated with the channel being received and/or transmitted results in the apparatus being tuned to a null point where the beat frequencies cancel each other out. Such null point tuning does not affect the quality of the television signal.

Figure 2:
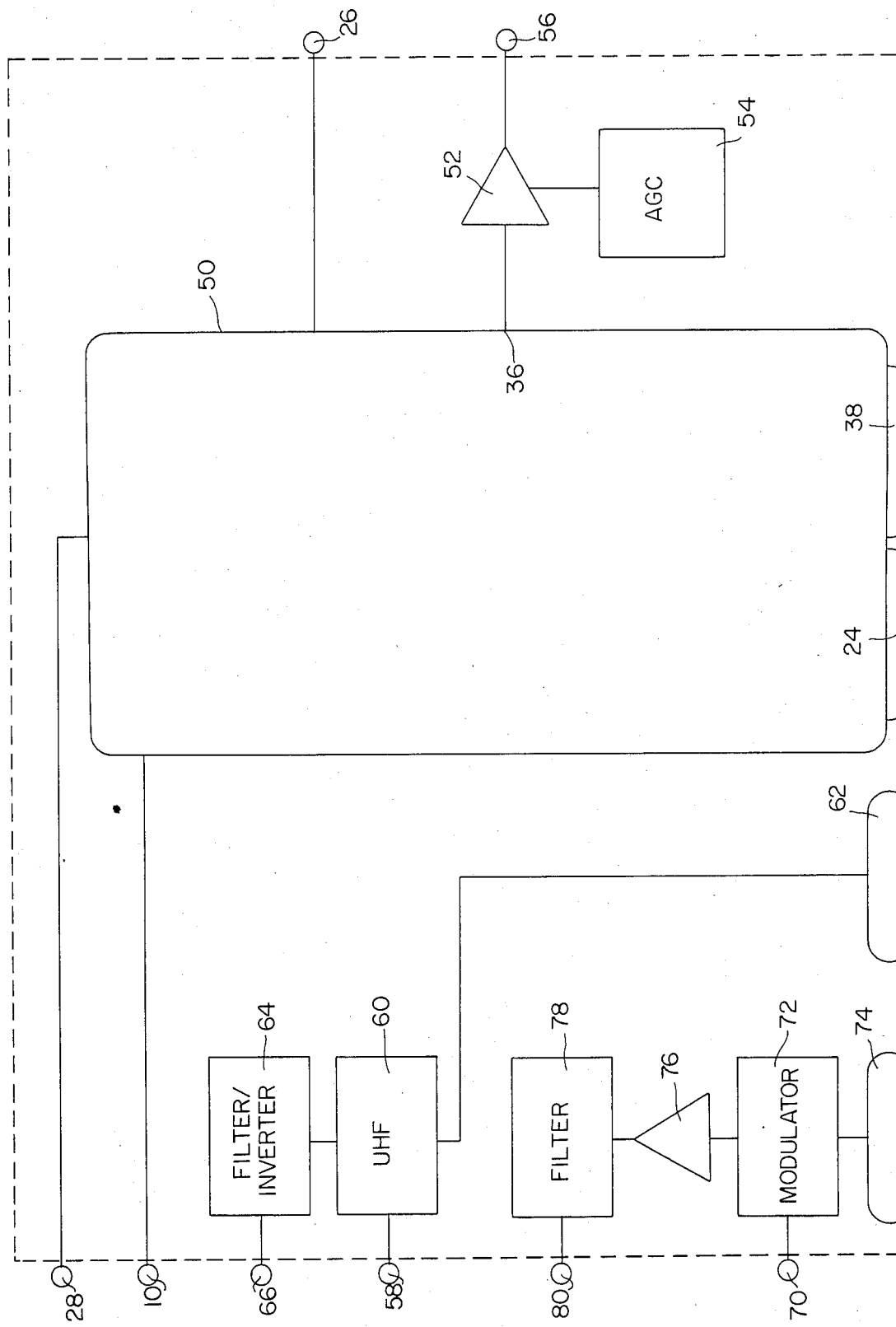
FIG. 2 is a block diagram of a further circuit arrangement of the instant invention which also includes the circuit arrangement of FIG. 1.

A further embodiment of the instant invention is shown in FIG. 2, wherein the circuit described in FIG. 1 is incorporated. Inputs 10 and 28 and output 26 remain unchanged from that shown in the first embodiment. Output 36, however, has further been provided with amplifier 52, an in-line amplifier capable of amplifying the television signal by 66 dBmV and an automatic gain control (AGC) circuit. These components provide a greater and more stable signal at output 56. Since each of these components are sufficiently known in the art, no detailed description of the components or function is deemed necessary.

Unlike the apparatus of FIG. 1, which was capable of selecting or transmitting VHF channels only, i.e. approximately 1296 input/output channel combinations, the apparatus shown in FIG. 2 is further capable of selecting UHF channels and auxiliary channels such as base band audio or video signals or television I.F. signals from other conventional sources. With reference to the UHF selection of signals, such signals are input at 58 to variable UHF tuner 60. Particular UHF channels are selected by manipulating control 62. The UHF tuner in the preferred embodiment is a Model UES-A56F of Mitsumi Electric Co., Ltd. of Melville, NY (Mitsumi). The output from tuner 60 is passed through a combination surface acoustic wave (SAW) filter/inverter 64. The signal which is transmitted from tuner 60 is inverted in that the audio portion precedes the video portion of the television signal. So that the eventual signal from output 56 is correctly oriented, it is necessary to invert again the output of tuner 60.

In the instant embodiment, the output of tuner 60 is the equivalent frequency of the VHF television signal for channel 4. Passing the UHF signal through SAW filter 64 serves to remove extraneous and interfering signals. The output of member 64, now at the channel 4 frequency, is transmitted at output 66 to input 10.

The combination of the variable UHF tuner and the previously described VHF tuner are considered in the instant embodiment to be collectively the first variable tuner. In other words, the first variable tuner is capable of selecting any television frequency in the UHF-VHF range of television signal frequencies.

Auxiliary signals, such as studio generated signals are received at input 70 and pass through modulator 72. Modulator 72 in the preferred embodiment is an UM 1285-8 modulator from Astec International, Santa Clara, CA (Astec) which serves to convert the signal at input 70 to an intermediate frequency signal which is the equivalent frequency of channel 4. Control 74 serves to adjust the audio and video levels. The design of such controls is suggested by the modulator manufacturer since they effect the percentage of modulation. The output of modulator 72 is passed through amplifier 76 and thereafter to SAW filter 78 from which it is transmitted at output 80. When viewing signals received at input 70, output 80 is preferably connected to input 10.

With the additional signal processing capability, the embodiment illustrated in FIG. 2 is capable of being used in over four thousand (4,000) input/output signal combinations. Such versatility is believed to significantly reduce the number of dedicated devices presently required in television system inventories.

Figure 3:
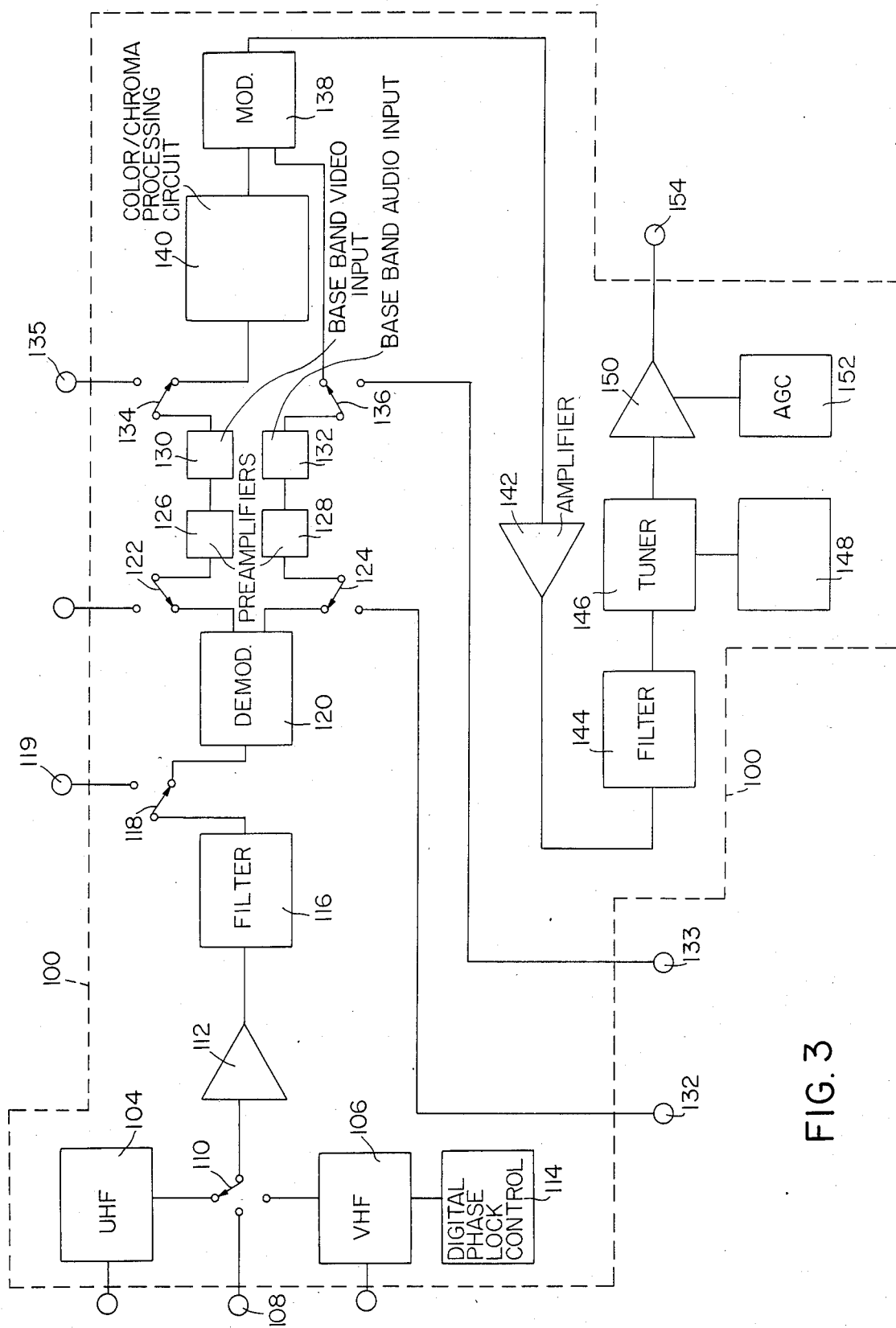
FIG. 3 is a block diagram of the circuit arrangement of another embodiment of the instant invention where the selected television signal is demodulated and therafter modulated.

A still further embodiment of the instant invention is shown in FIG. 3, wherein an apparatus for receiving a television signal of one frequency and for transmitting the television signal at another frequency is shown and designated 100. The television signal received from any conventional source, such as a television antenna or cable is applied to UHF tuner 104 and VHF tuner 106. The choice of the output from either tuner or a standard I.F. frequency input at 108 is made by the system owner through switch 110. In the preferred embodiment tuner 104 is a Model UES-A56F and tuner 106 is a Model CATV3-AR51P both available from Mitsumi. The tuners serve to select the desired television channel and present it, at a lower frequency approximately 45.75 MHz, to I.F. amplifier 112. Control 114 is a standard digital phase lock control, known in the art, for digitally selecting a VHF channel by tuner 106. In the preferred embodiment, I.F. amplifier 112 is an MC 1350 integrated circuit chip sold by Motorola Corp. The output from amplifier 112 is passed through SAW filter 116. Switch 118 allows the selected channel, now at I.F. frequency, to be output should it be desired to not process the television signal further.

The signal from filter 116 next passes through a demodulator/modulator combination. Demodulator 120 in the preferred embodiment is a video detector with separate audio output such as an MC-1330 from Motorola Corp. Such a device strips the carrier frequency from the television signal, leaving the television signal video and audio at base band frequency. Switches 122 and 124 serve to allow the video and audio base band signals to pass to standard preamplifiers 126 and 128, respectively, or to allow substitute base band video or audio to be input at inputs 130 and 132 respectively. The base band signals pass through preamplifiers 126 and 128 and standard television amplifiers 130 and 132. Switches 134 and 136 allow the now amplified base band audio/video signals to be output should no further processing be desired.

If further processing is desired, the audio base band signal passes directly to modulator 138 which in the preferred embodiment is a Model UM 1285-8 from Astec. The video base band signal from amplifier 130 is first passed through a standard color-chroma processing circuit 140 before being input to modulator 138. Modulator 138 serves to place the base band audio and video signals on a new intermediate carrier frequency, which in the preferred form of this embodiment is channel 4. The modulated signal is therafter passed through amplifier 142 and SAW filter 144. The selected television signal therafter is passed through output tuner 146 which, via a second standard digital phase locking control 148, is transmitted on a digitally selected channel to the final output amplifier 150. Amplifier 150 with automatic gain control 152 amplifies the television signal on the selected output channel by 66 dBmV.

It should be noted that tuner 146 in the preferred embodiment is a Model CATV3-A51P by Mitsumi, similar to tuner 106, however, modified to transmit signals rather than select them. Such modifications are achieved by reversing the I.F. and R.F. amplifiers. This is accomplished by reversing the input to output connections for those amplifiers in the tuner. I have discovered that such modifications do not affect the quality of the selected television signal nor do they affect the accuracy of the digital controller.

With the additional signal selection capability of this last described embodiment, i.e. 60 VHF and 69 UHF input channels, I.F. input and output and audio/video base band input and output, approximately eight thousand (8,000) channel input/output signal combinations are possible. The need for CATV system, MATV system or Cable TV system owners to maintain large inventories of dedicated channel processing devices has been virtually eliminated.

While particular embodiments of the invention have been shown and described, it will be obvious to those skilled in the art that changes and modifications may be made without departing from the invention in its broader aspects, and therefore, reference should be made to the appended claims, rather than to the foregoing specification, as indicating the scope of the invention.

I claim:

1. An apparatus for receiving a television signal of one frequency and for transmitting the television signal at another frequency, comprising:
   a first continuously variable tuner for selecting a television signal of a first frequency and converting said television signal to an intermediate frequency;
   reference output means, connected to receive the output of said first continuously variable tuner, for converting the output of said first variable tuner from said intermediate frequency to a reference frequency in response to an enabling signal;
   switch means, connected to said reference output means, for generating said enabling signal upon actuation; and
   a second continuously variable tuner, connected to receive the output of said first variable tuner, for transmitting the television signal at a second television signal frequency, whereby television signals of one frequency can be converted to a second frequency.
2. The apparatus of claim 1 wherein the first and second frequencies are in the VHF range of television frequencies.
3. The apparatus of claim 1, further comprising demodulator means for demodulating television signals and modulating means connected to receive the output of the demodulator means, for modulating television signals, the demodulator means and modulator means being interposed between the first and second variable tuners, so that the television signal is demodulated and thereafter modulated prior to its transmission on the second television frequency.
4. The apparatus as claimed in claim 1, wherein said reference frequency is that frequency corresponding to television channel 2.
5. A method of receiving a television signal of one frequency and for transmitting the television signal at another frequency, comprising the steps of:
   selecting a television signal from a range of television signal frequencies by applying said range of television signal frequencies to a first continuously variable tuner, which first tuner serves to filter therethrough a single television signal from said first range and outputs therefrom said single television signal at an intermediate frequency, thereafter applying said television signal at said intermediate frequency to reference tuner which outputs said television signal at a fixed reference frequency, and monitoring the output of said reference tuner so that the television signal passing through said first tuner is the selected television signal;
   applying said selected television signal to a second variable tuner which receives said selected television signal at said intermediate frequency and converts said selected television signal to a second television signal frequency; and
   providing said selected television signal at said second frequency at the output of said second variable tuner so that a television signal of a first frequency is received, converted and output at a second frequency.

* * * * *